US012573712B2

(12) United States Patent
Lee et al.

(10) Patent No.: US 12,573,712 B2
(45) Date of Patent: Mar. 10, 2026

(54) BATTERY MODULE AND BATTERY PACK INCLUDING THE SAME

(71) Applicant: LG ENERGY SOLUTION, LTD., Seoul (KR)

(72) Inventors: Junghoon Lee, Daejeon (KR); Junyeob Seong, Daejeon (KR); Hyemi Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 620 days.

(21) Appl. No.: 17/925,545

(22) PCT Filed: Oct. 18, 2021

(86) PCT No.: PCT/KR2021/014498

§ 371 (c)(1),
(2) Date: Nov. 15, 2022

(87) PCT Pub. No.: WO2022/092659

PCT Pub. Date: May 5, 2022

(65) Prior Publication Data

US 2023/0198092 A1     Jun. 22, 2023

(30) Foreign Application Priority Data

Oct. 27, 2020     (KR) ........................ 10-2020-0140611

(51) Int. Cl.
H01M 50/383 (2021.01)
H01M 50/211 (2021.01)
H01M 50/24 (2021.01)

(52) U.S. Cl.
CPC ....... H01M 50/383 (2021.01); H01M 50/211 (2021.01); H01M 50/24 (2021.01)

(58) Field of Classification Search
CPC .. H01M 50/383; H01M 50/211; H01M 50/24; H01M 50/289; H01M 2220/02; Y02E 60/10
See application file for complete search history.

(56) References Cited

U.S. PATENT DOCUMENTS

| | | |
|---|---|---|
| 2014/0014376 A1 | 1/2014 | Schaefer |
| 2014/0193685 A1 | 7/2014 | Lim |
| 2017/0214018 A1 | 7/2017 | Sun et al. |

(Continued)

FOREIGN PATENT DOCUMENTS

| | | |
|---|---|---|
| CN | 108028334 A | 5/2018 |
| CN | 210838022 U | 6/2020 |

(Continued)

OTHER PUBLICATIONS

KR 102149439 MT (Year: 2020).*

*Primary Examiner* — Alexander Usyatinsky
(74) *Attorney, Agent, or Firm* — Bryan Cave Leighton Paisner LLP

(57)                ABSTRACT

A battery module and a battery pack comprising the same are provided. The battery module includes a battery cell stack comprising a plurality of battery cells; a module frame accommodating the battery cell stack; flame-retardant members disposed between at least one pair of battery cells adjacent to each other in the battery cell stack; and a fire extinguishing member disposed between the module frame and an upper portion of the battery cell stack.

12 Claims, 5 Drawing Sheets

100

(56)          References Cited

U.S. PATENT DOCUMENTS

| 2018/0048036 | A1 |   | 2/2018 | Melack et al. |  |
| 2018/0076493 | A1 | * | 3/2018 | Park | H01M 50/227 |
| 2018/0248160 | A1 |   | 8/2018 | Lee |  |
| 2018/0269440 | A1 |   | 9/2018 | Lee et al. |  |
| 2019/0067656 | A1 | * | 2/2019 | Zhang | H01M 50/289 |
| 2020/0067040 | A1 |   | 2/2020 | Kim et al. |  |
| 2020/0099114 | A1 | * | 3/2020 | Ryu | H01M 10/615 |
| 2020/0185797 | A1 |   | 6/2020 | Park et al. |  |
| 2023/0198092 | A1 |   | 6/2023 | Lee et al. |  |

FOREIGN PATENT DOCUMENTS

| CN | 112909421 | A |   | 6/2021 |
| CN | 216389631 | U |   | 4/2022 |
| EP | 3264492 | A1 |   | 3/2018 |
| EP | 3451407 | A1 |   | 3/2019 |
| JP | H05-266925 | A |   | 10/1993 |
| JP | H07-272751 | A |   | 10/1995 |
| JP | 2000067825 | A |   | 3/2000 |
| JP | 2014502000 | A |   | 1/2014 |
| JP | 2020-040385 | A |   | 3/2020 |
| JP | 2020041121 | A |   | 3/2020 |
| JP | 2020-524370 | A |   | 8/2020 |
| KR | 10-1730961 | B1 |   | 4/2017 |
| KR | 10-2017-0058068 | A |   | 5/2017 |
| KR | 10-2019-0094921 | A |   | 8/2019 |
| KR | 10-2020-0021609 | A |   | 3/2020 |
| KR | 10-2123684 | B1 |   | 6/2020 |
| KR | 10-2149439 | B1 |   | 8/2020 |
| KR | 102149439 |  | * | 8/2020 |

* cited by examiner

【FIG. 1】
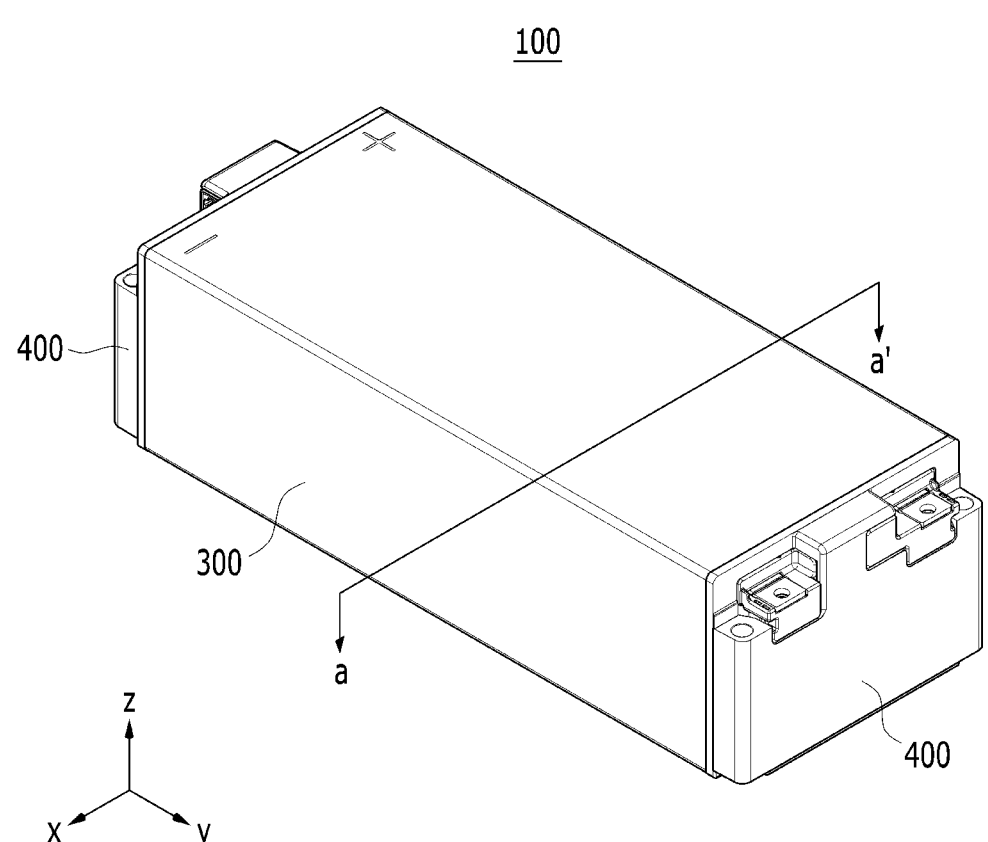

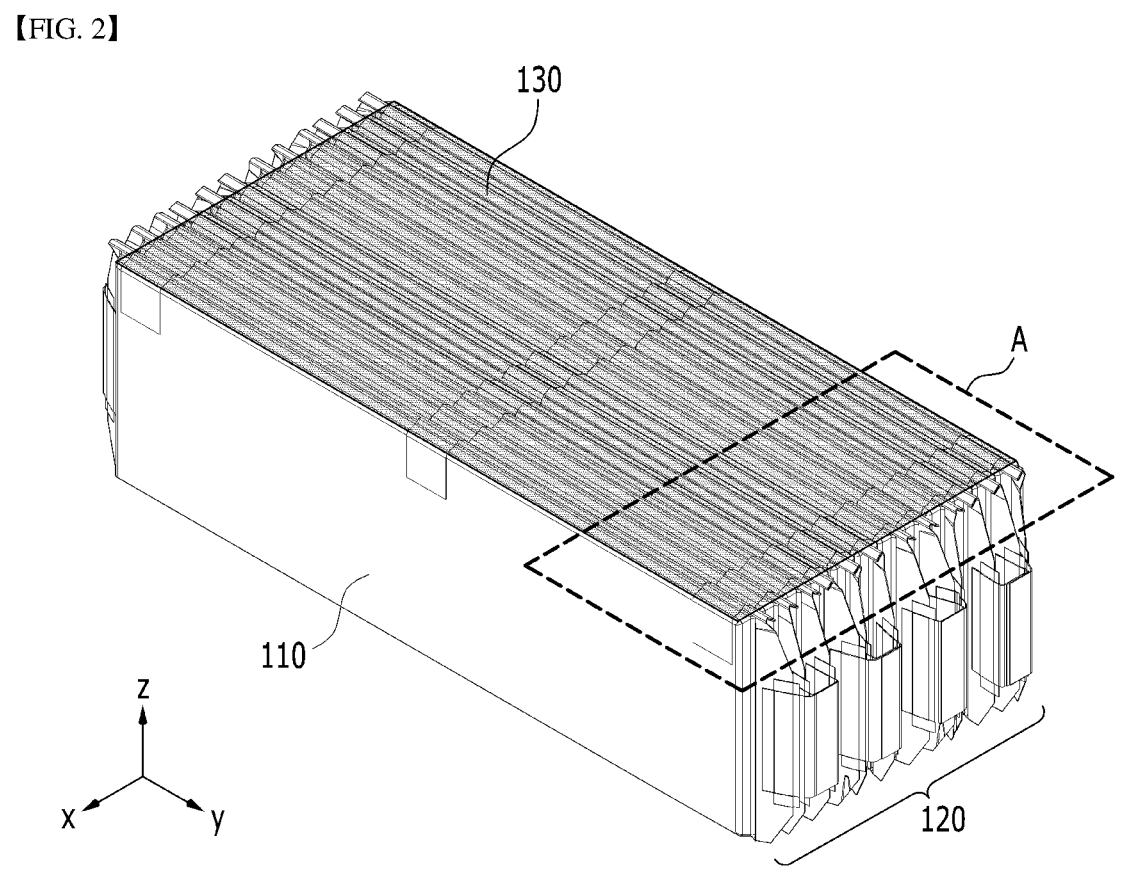

【FIG. 2】

【FIG. 3】
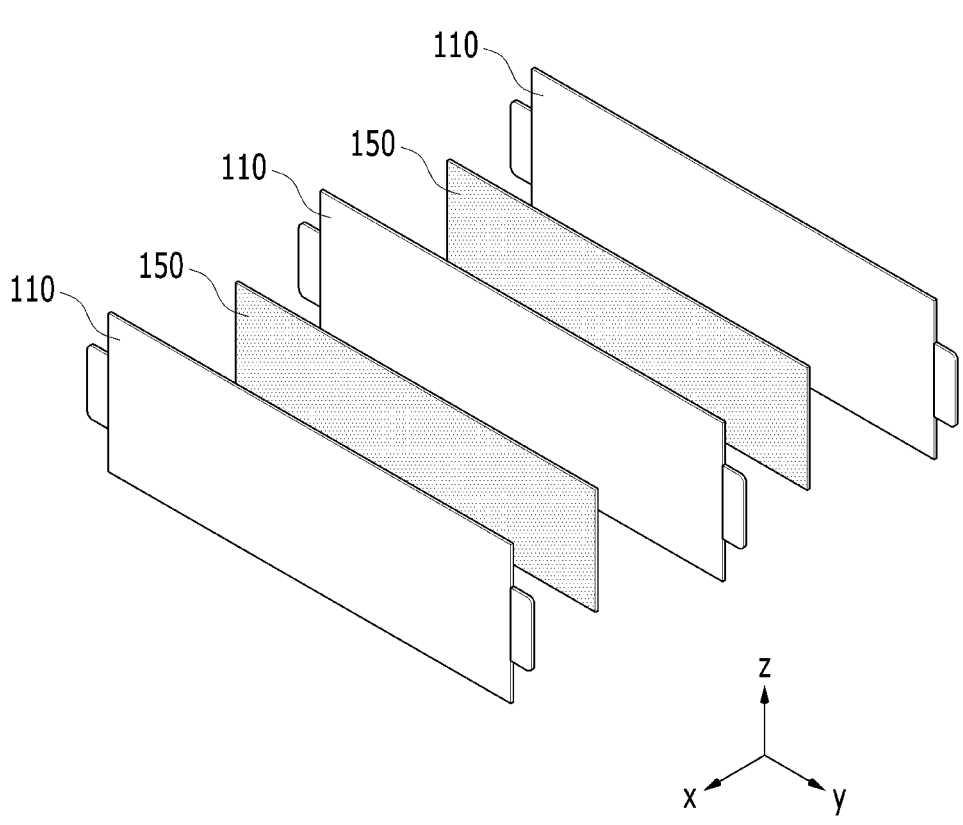
【FIG. 4】
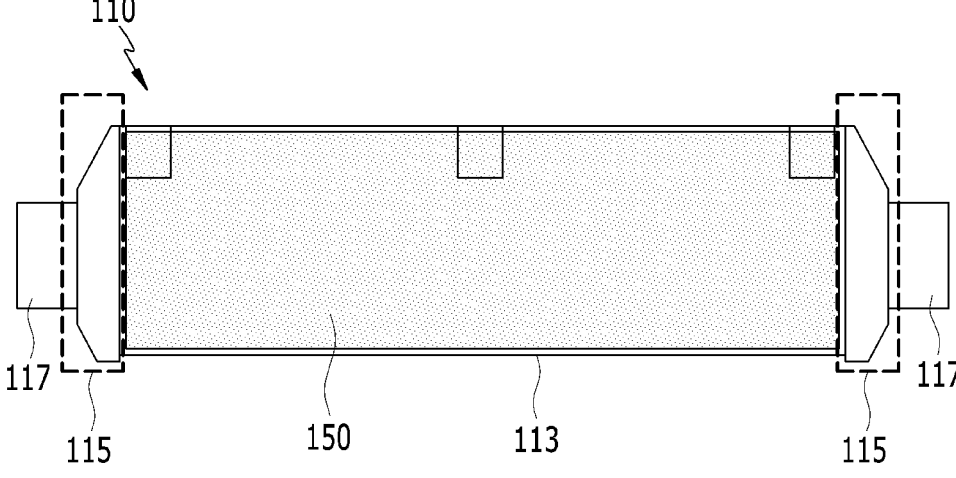

【FIG. 5】
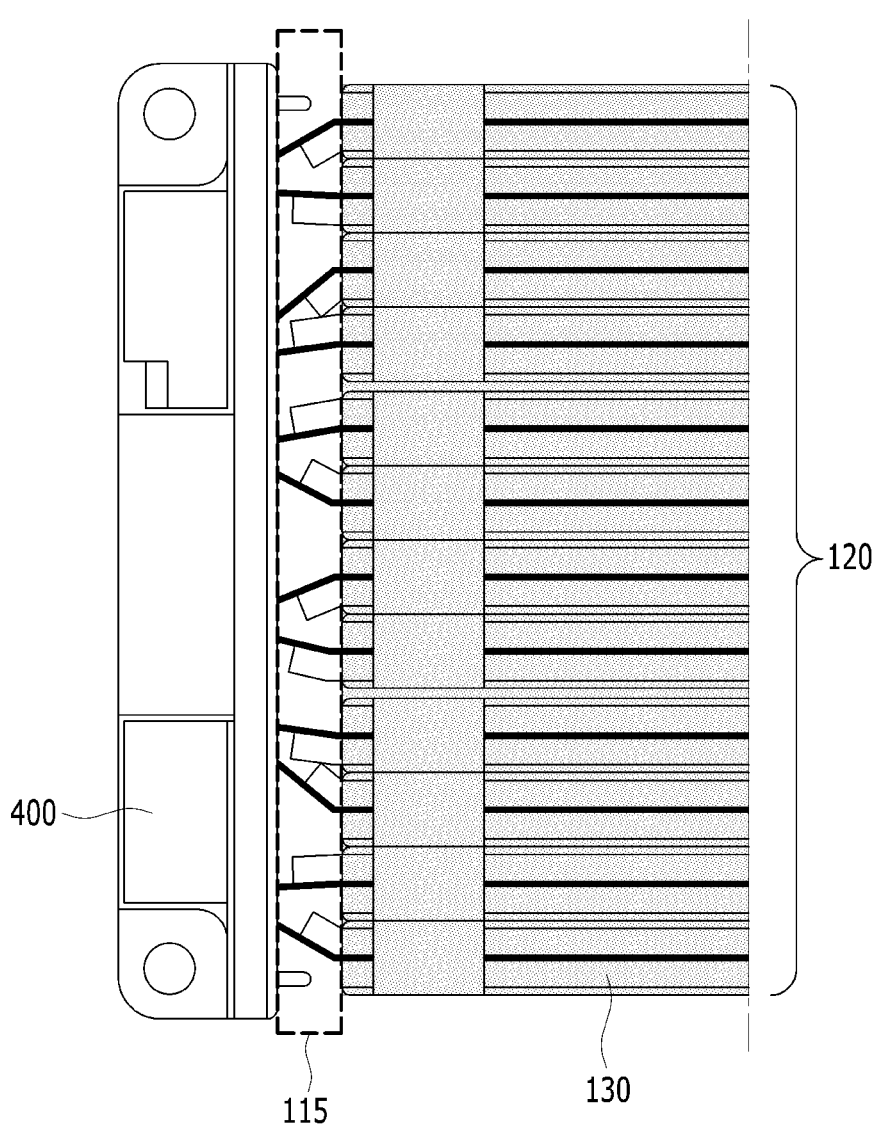

[FIG. 6]
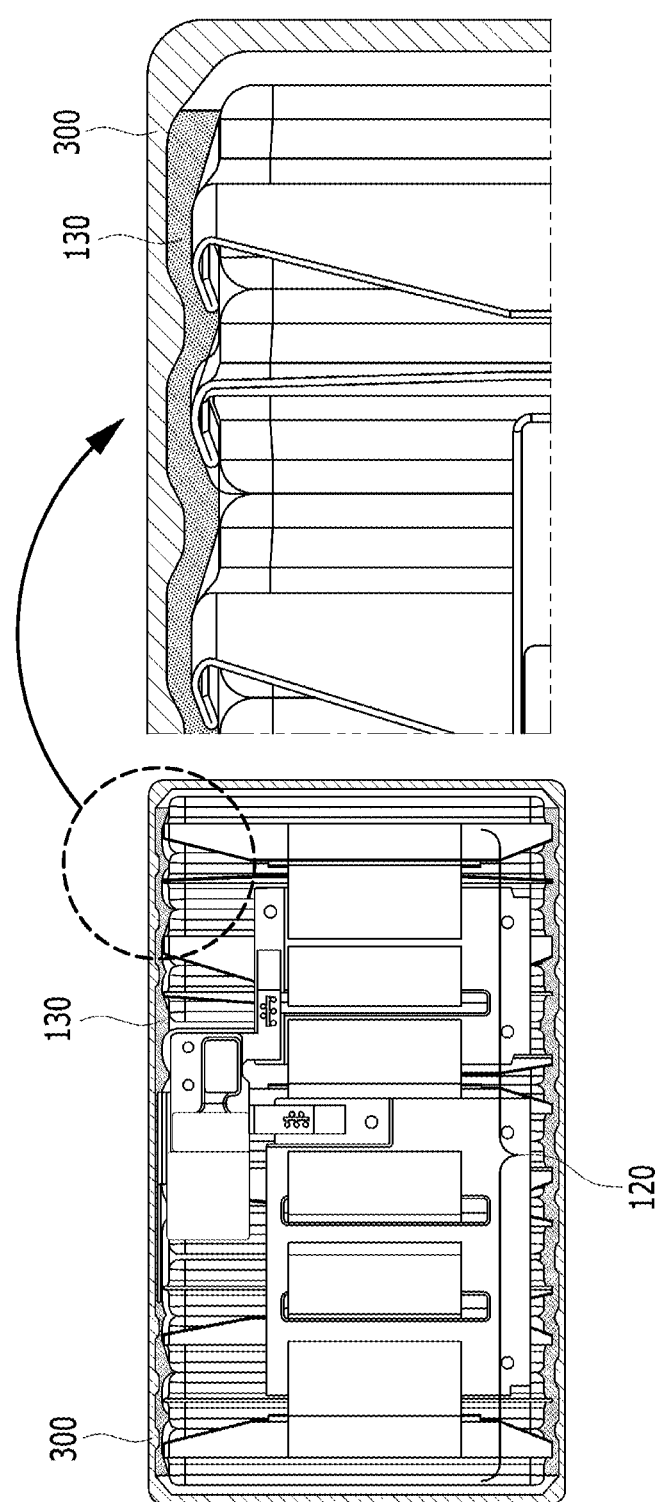

BATTERY MODULE AND BATTERY PACK INCLUDING THE SAME

CROSS-REFERENCE TO RELATED APPLICATION

This application is a National Stage Application of International Application No. PCT/KR2021/014498, filed on Oct. 18, 2021, which claims priority to and the benefit of Korean Patent Application No. 10-2020-0140611 filed on Oct. 27, 2020, the disclosures of which are incorporated herein by reference in their entireties.

FIELD OF DISCLOSURE

The present disclosure relates to a battery module and a battery pack including the same, and more particularly, to a battery module that effectively delays the speed of heat propagation between battery cells, and a battery pack including the same.

BACKGROUND

As technology development and demands for mobile devices increase, the demand for batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. For this reason, a prismatic battery, a pouch-shaped battery or the like, which can be stacked with high integration and has a small weight relative to capacity, is usually used as a battery cell of the middle or large-sized battery module. Meanwhile, in order to protect the battery cell stack from external impact, heat or vibration, the battery module may include a module frame in which a front surface and rear surface are opened to house the battery cell stack in an internal space.

In the conventional battery module, the battery cells are attached to each other through an adhesive material such as a double-sided tape between the battery cells in a battery cell stack. However, in this case, when a fire occurs in the battery module, there is a problem that it is difficult to delay the transfer of ignition phenomenon occurring in some battery cells to other battery cells. Further, in some battery modules, a compression pad made of a polyurethane material is attached between battery cells in order to prevent a swelling phenomenon of the battery cells, but the compression pad also has a problem that the effect of delaying the heat propagation time is insufficient. Consequently, unlike the conventional case, there is a need to develop a battery module that effectively delays the speed of heat propagation between battery cells and has improved safety.

SUMMARY

It is an object of the present disclosure to provide a battery module that effectively delays the speed of heat propagation between battery cells, and a battery pack including the same.

The objects of the present disclosure are not limited to the aforementioned objects, and other objects which are not described herein should be clearly understood by those skilled in the art from the following detailed description.

According to one embodiment of the present disclosure, there is provided a battery module comprising: a battery cell stack comprising a plurality of battery cells; a module frame accommodating the battery cell stack; flame-retardant members disposed between at least one pair of battery cells adjacent to each other in the battery cell stack; and a fire extinguishing member disposed between the module frame and an upper portion of the battery cell stack.

The flame-retardant members may be disposed at the same interval from each other in the battery cell stack.

The flame-retardant member may be extended along the length direction and the width direction of the battery cells.

The fire extinguishing member may be extended along a stacking direction of the battery cell stack between the module frame and the upper portion of the battery cell stack.

A thickness of the fire extinguishing member may be equal to a distance separated between the module frame and the upper portion of the battery cell stack.

The battery cell may include a central portion, electrode lead portions disposed on both sides of the central portion respectively, and an electrode lead protruding from an end of the electrode lead portion.

The flame-retardant member may be extended along the length and width directions of the central portion.

The flame-retardant member may be extended to a boundary line between the central portion and the electrode lead portion.

A width of the fire extinguishing member may be extended along a stacking direction of the battery cell stack between the module frame and the upper portion of the battery cell stack.

A length of the fire extinguishing member may be extended along a longitudinal direction of the central portion on a side surface of the central portion.

A length of the flame-retardant member may be extended to a boundary line between the central portion and the electrode lead portion on a side surface of the central portion.

According to one embodiment of the present disclosure, there is provided a battery pack comprising the above-mentioned battery module.

According to embodiments of the present disclosure, flame-retardant members are located between at least one pair of battery cells adjacent to each other in the battery cell stack, and a fire extinguishing member is located on an upper portion of the battery cell stack, thereby capable of effectively delaying the speed of heat propagation between battery cells.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view of a battery module according to an embodiment of the present disclosure;

FIG. 2 is a perspective view of a battery cell stack in the battery module of FIG. 1 from which a module frame is removed;

FIG. 3 is an exploded perspective view of the battery cell stack of FIG. 2;

FIG. 4 is a side view showing a battery cell of the battery cell stack of FIG. 3 to which a flame-retardant member is attached;

FIG. 5 is a top view of region A of FIG. 2; and

FIG. 6 is a cross-sectional view of the battery module taken along the cutting line a-a' of FIG. 1.

DETAILED DESCRIPTION

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, the size and thickness of each element shown in the figures are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, throughout the specification, when a portion is referred to as "including" a certain component, it means that the portion can further include other components, without excluding the other components, unless otherwise stated. Further, throughout the specification, when referred to as "planar", it means when a target portion is viewed from the upper side, and when referred to as "cross-sectional", it means when a target portion is viewed from the side of a cross section cut vertically.

Below, the battery module according to one embodiment of the present disclosure will be described. However, the description herein is made based on the front surface of the front and rear surfaces of the battery module, without being limited thereto, and even in the case of the rear surface, the same or similar contents may be described.

FIG. 1 is a perspective view of a battery module according to one embodiment of the present disclosure. FIG. 2 is a perspective view of a battery cell stack in the battery module of FIG. 1 from which a module frame is removed.

Referring to FIGS. 1 and 2, the battery module 100 according to the embodiment of the present disclosure includes a battery cell stack 120 in which a plurality of battery cells 110 are stacked, a module frame 300 accommodating the battery cell stack 120, and end plates 400 located on the front and rear surfaces of the battery cell stack 120. In addition, a busbar frame (not shown) may be located between the front and rear surfaces of the battery cell stack 120 and the end plates 400, and a busbar may be located on the busbar frame (not shown).

The module frame 300 may include a U-shaped frame containing a bottom portion and a side portion, of which an upper surface, a front surface and a rear surface are opened, and an upper plate that covers an upper portion of the battery cell stack 120. However, the module frame 300 is not limited thereto, and can be replaced with a frame having another shape such as a mono frame surrounding the battery cell stack 120, except for the L-shaped frame or the front and rear surfaces.

The battery cell 110 is preferably a pouch-type battery cell. The battery cell can be manufactured by housing the electrode assembly in a pouch case of a laminate sheet including a resin layer and a metal layer, and then heat-sealing the sealing portion of the pouch case. Such a battery cell 110 may be composed of a plurality of cells, and the plurality of battery cells 110 form a battery cell stack 120 that is stacked so as to be electrically connected to each other. In particular, as shown in FIG. 2, a plurality of battery cells 110 may be stacked along a direction parallel to the x-axis.

Further, referring to FIGS. 1 and 2, the battery module 100 according to the embodiment of the present disclosure includes a fire extinguishing member 130 located between the module frame 300 and the upper portion of the battery cell stack 120.

Referring to FIG. 2, the fire extinguishing member 130 may be extended along the stacking direction (x-axis) of the battery cell stack 120 between the module frame 300 and the upper portion of the battery cell stack 120. Here, the width of the fire extinguishing member 130 may be extended along the stacking direction (x-axis) of the battery cell stack between the module frame and the upper portion of the battery cell stack. More preferably, the width of the fire extinguishing member 130 may be extended to be equal to or smaller than the width of the upper portion of the battery cell stack between the module frame and the upper portion of the battery cell stack.

Therefore, in the battery module 100 according to the embodiment of the present disclosure, the fire extinguishing member 130 is disposed at a position corresponding to the upper portion of the battery cell stack 120, and when a flame occurs in some of the battery cells 110 of the battery cell stack 120, the intensity of flames occurred in the battery cell 110 can be effectively suppressed. In addition, the safety of the battery module 100 can also be improved.

The fire extinguishing member 130 may be a member containing an extinguishing agent material. Here, the fire extinguishing member 130 may be a member in the form of a foam. Further, the extinguishing agent material may be an extinguishing agent in the form of a powder that is commonly used. As one example, the extinguishing agent material is sodium hydrogen carbonate ($NaHCO_3$), potassium hydrogen carbonate ($KHCO_3$), ammonium phosphate ($NH_4H_2PO_3$), and a mixture of "potassium hydrogen carbonate ($KHCO_3$) and urea ($(NH_2)_2CO$)". In particular, the extinguishing agent material containing in the extinguishing member 130 may include potassium hydrogen carbonate ($KHCO_3$). However, the fire extinguishing agent material is not limited thereto, and can be used without limitation as long as it is a material that performs a fire extinguishing function.

Therefore, when an ignition phenomenon occurs in the battery module 100 according to the embodiment of the present disclosure, the fire extinguishing member 130 is located adjacent to the upper portion of the battery cell stack 120, so that the strength of flames can be effectively suppressed. In addition to this, in the process of extinguishing flames generated in the battery cell 110 by the extinguishing member 130, carbon dioxide and water vapor may be generated. Such reaction is endothermic and can absorb the heat of the battery cell 110 and also can cut off oxygen supply, whereby flame and heat propagation speed between the battery cells 110 can be effectively delayed. In addition, the safety of the battery module 100 can also be improved.

FIG. 3 is an exploded perspective view of the battery cell stack of FIG. 2. FIG. 4 is a top view showing a battery cell in a state in which a flame-retardant member is attached in the battery cell stack of FIG. 3.

Referring to FIG. 3, the flame-retardant member 150 is located between at least a pair of battery cells 110 adjacent to each other in the battery cell stack 120. Further, the flame-retardant member 150 may be located between the battery cells 110 adjacent to each other in the battery cell stack 120. However, although not limited thereto, the number of flame-retardant members 150 disposed in the battery cell stack 120 can be disposed to the extent sufficient to maintain the density of the battery cells 110 in the battery module 100 in an appropriate range while delaying the ignition phenomenon.

The flame-retardant members 150 may be disposed at the same interval from each other in the battery cell stack 120. However, although not limited thereto, the flame-retardant member may be arranged around a position that has a high possibility of being ignited in the battery cell stack 120.

The flame-retardant member 150 may be a flame-retardant material member. Here, the flame-retardant member 150 may be a member in the form of a foam. More preferably, the flame-retardant member 150 may be a flame-retardant material member having high compressibility. For example, the flame-retardant member 150 may be selected from silicone foam, mica sheet, and the like. However, although not limited thereto, the flame-retardant member can be used without limitation as long as it is a material made of a flame retardant material.

Therefore, in the battery module 100 according to the embodiment of the present disclosure, when a flame occurs from some of the battery cells 110 of the battery cell stack 120 by bordering the flame-retardant member 150, the propagation of heat to other battery cells can be effectively prevented or delayed. In addition, the safety of the battery module 100 can also be improved.

The flame-retardant member 150 can be extended along a length direction and a width direction of the battery cell 110. Further, the area of the flame-retardant member 150 can be extended along the length and width directions of the battery cell 110, but may be smaller than the area of the battery cell 110 or can be the same as the area of the battery cell 110.

In the battery module 100 according to the embodiment of the present disclosure, when a flame occurs in some of the battery cells 110 of the battery cell stack 120 by bordering the flame-retardant member 150, the propagation of heat to other battery cells can be effectively prevented or delayed. In addition, the safety of the battery module 100 can also be improved.

Further, referring to FIG. 4, the battery cell 110 includes a central portion 113, and electrode lead portions 115 located on both sides of the central portion 113, respectively. Here, the electrode lead 117 may protrude from the end of the electrode lead portion 115. An electrode stack, in which a positive electrode, a negative electrode, and a separator interposed between the positive electrode and the negative electrode are stacked, is located in the central portion 113 of the battery cell 110.

Referring to FIG. 4, the flame-retardant member 150 may be extended along the length direction and the width direction of the central portion 113 of the battery cell 110. Further, the flame-retardant member 150 can be extended to a boundary line between the central portion 113 and the electrode lead portion 115.

Therefore, in the battery module 100 according to the embodiment of the present disclosure, the flame-retardant member 150 is arranged around the central portion 113 of the battery cell 110, and when a flame is occurred by a chemical reaction in the electrode stack located at the central portion 113, the propagation of flame and/or heat to other battery cells 110 can be effectively prevented or delayed. In addition to this, it is possible to effectively cover the central portion 113 of the battery cell 110 even while minimizing the area of the flame-retardant member 150. Further, the safety of the battery module 100 can be improved.

FIG. 5 is a top view of region A of FIG. 2 as viewed from above. FIG. 6 is a cross-sectional view of the battery module taken along the cutting line a-a' of FIG. 1.

Referring to FIGS. 2 and 5, the length of the fire extinguishing member 130 may be extended along the longitudinal direction (y-axis) of the battery cell stack between the module frame and the upper portion of the battery cell stack.

Referring to FIGS. 4 and 5, the length of the fire extinguishing member 130 may be extended along the longitudinal direction (y-axis) of the central portion 113 on a side surface of the central portion 113 of the battery cell 110. Further, the length of the fire extinguishing member 130 may be extended to the boundary line between the central portion 113 and the electrode lead portion 115 on the side surface of the central portion 113 of the battery cell 110.

Therefore, in the battery module 100 according to the embodiment of the present disclosure, the fire extinguishing member 130 is disposed around the side surface of the central portion 113 of the battery cell 110, and when a flame is occurred by a chemical reaction in the electrode stack located in the central portion 113, the propagation of flame and/or heat to other battery cells 110 can be more effectively prevented or delayed. In addition to this, while minimizing the area of the fire extinguishing member 130, flames can be effectively suppressed around the central portion 113 of the battery cell 110, and the safety of the battery module 100 can also be improved.

Referring to FIGS. 1 and 6, the thickness of the fire extinguishing member 130 may correspond to a distance separated between the module frame 300 and the upper portion of the battery cell stack 120. More preferably, the thickness of the fire extinguishing member 130 may be the same as the distance separated between the module frame 300 and the upper portion of the battery cell stack 120.

Therefore, in the battery module 100 according to the embodiment of the present disclosure, the fire extinguishing member 130 fills a space separated between the upper portion of the battery cell stack 120 and the module frame 300 and prevents volume expansion due to the swelling phenomenon of the battery cell stack 120. At the same time, the fire extinguishing member 130 is located adjacent to the upper portion of the battery cell stack 120, thereby capable of effectively suppressing the strength of flames occurring in the battery cell 110. In addition, the safety of the battery module 100 can also be improved.

A battery pack according to another embodiment of the present disclosure includes the above-mentioned battery module. Meanwhile, one or more of the battery modules according to the embodiment of the present disclosure can be packaged in a pack case to form a battery pack.

The above-mentioned battery module and a battery pack including the same can be applied to various devices. These devices can be applied to vehicle means such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
110: battery cell
113: central portion
115: electrode lead portion
117: electrode lead
120: battery cell stack
130: fire extinguishing member
150: flame retardant member
300: module frame
400: end plate

The invention claimed is:

1. A battery module comprising:
a battery cell stack comprising a plurality of battery cells;
a module frame accommodating the battery cell stack;
flame-retardant members disposed between at least one pair of battery cells adjacent to each other in the battery cell stack; and
a fire extinguishing member disposed between the module frame and an upper portion of the battery cell stack,
wherein a thickness of the fire extinguishing member is equal to a distance between the module frame and the upper portion of the battery cell stack.

2. The battery module of claim 1, wherein the flame-retardant members are disposed at the same interval from each other in the battery cell stack.

3. The battery module of claim 1, wherein each of the flame-retardant members is extended along a length direction and a width direction of the battery cells.

4. The battery module of claim 1, wherein the fire extinguishing member is extended along a stacking direction of the battery cell stack between the module frame and the upper portion of the battery cell stack.

5. The battery module of claim 1, wherein the battery cell comprises a central portion, electrode lead portions disposed on both sides of the central portion respectively, and an electrode lead protruding from an end of the electrode lead portion.

6. The battery module of claim 5, wherein the flame-retardant member is extended along a length direction and a width direction of the central portion.

7. The battery module of claim 6, wherein the flame-retardant member is extended to a boundary line between the central portion and the electrode lead portion.

8. The battery module of claim 5, wherein a width of the fire extinguishing member is extended along a stacking direction of the battery cell stack between the module frame and the upper portion of the battery cell stack.

9. The battery module of claim 8, wherein a length of the fire extinguishing member is extended along a longitudinal direction of the central portion on a side surface of the central portion.

10. The battery module of claim 8, wherein a length of the flame-retardant member is extended to a boundary line between the central portion and the electrode lead portion on a side surface of the central portion.

11. A battery pack comprising the battery module of claim 1.

12. A battery module comprising:
a battery cell stack comprising a plurality of battery cells;
a module frame accommodating the battery cell stack;
flame-retardant members disposed between at least one pair of battery cells adjacent to each other in the battery cell stack; and
a fire extinguishing member disposed between the module frame and an upper portion of the battery cell stack,
wherein the fire extinguishing member is a member in the form of a foam such that the fire extinguishing member fills a space separated between the upper portion of the battery cell stack and the module frame.

* * * * *